Sept. 7, 1948.  T. OAKLEY ET AL  2,448,616
GAS METER PROVER APPARATUS
Filed June 19, 1944  3 Sheets-Sheet 1
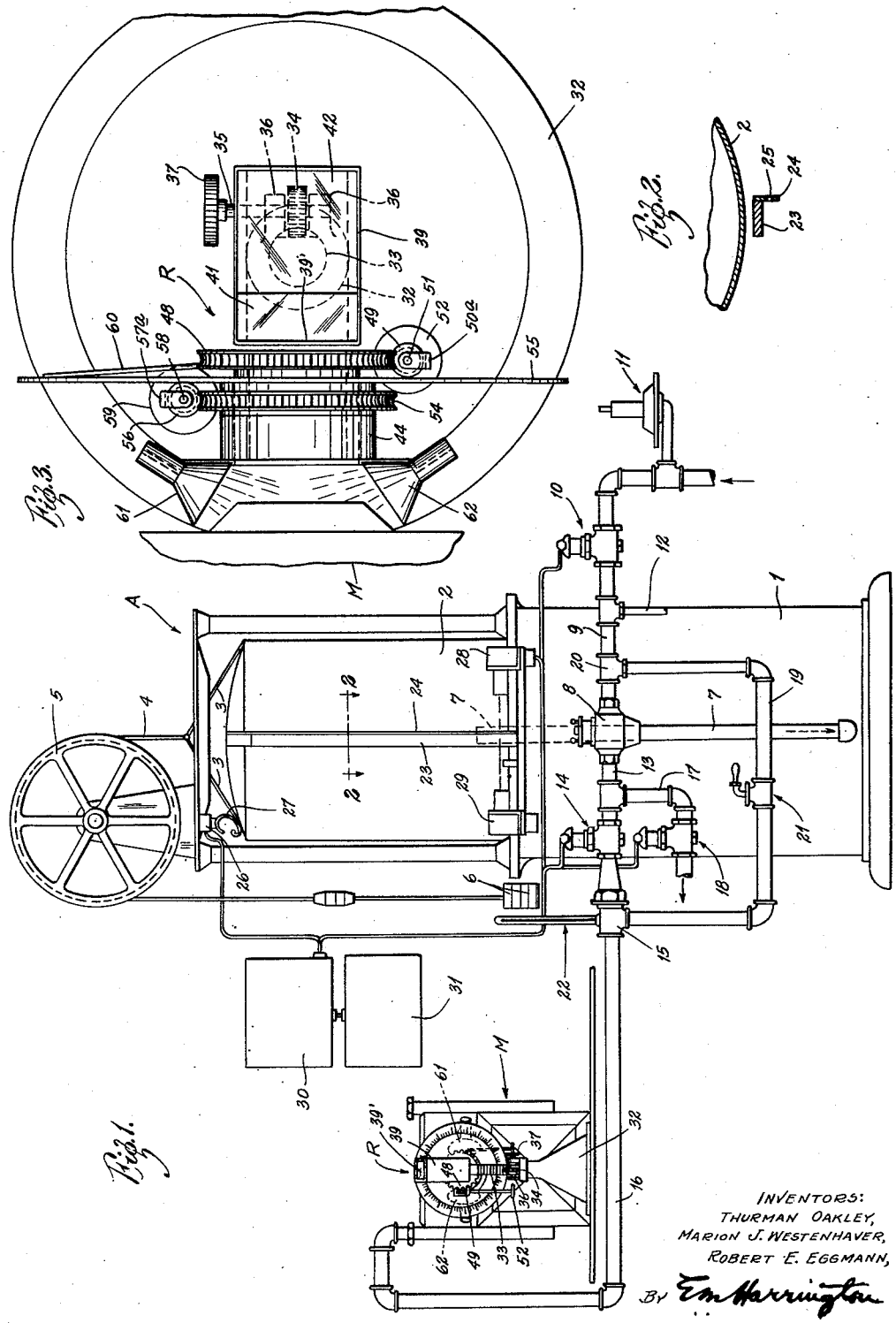
INVENTORS:
THURMAN OAKLEY,
MARION J. WESTENHAVER,
ROBERT E. EGGMANN,
By *Em Harrington*
ATTORNEY.

Sept. 7, 1948.　　　　T. OAKLEY ET AL　　　　2,448,616
GAS METER PROVER APPARATUS
Filed June 19, 1944　　　　　　　　　　　3 Sheets-Sheet 2
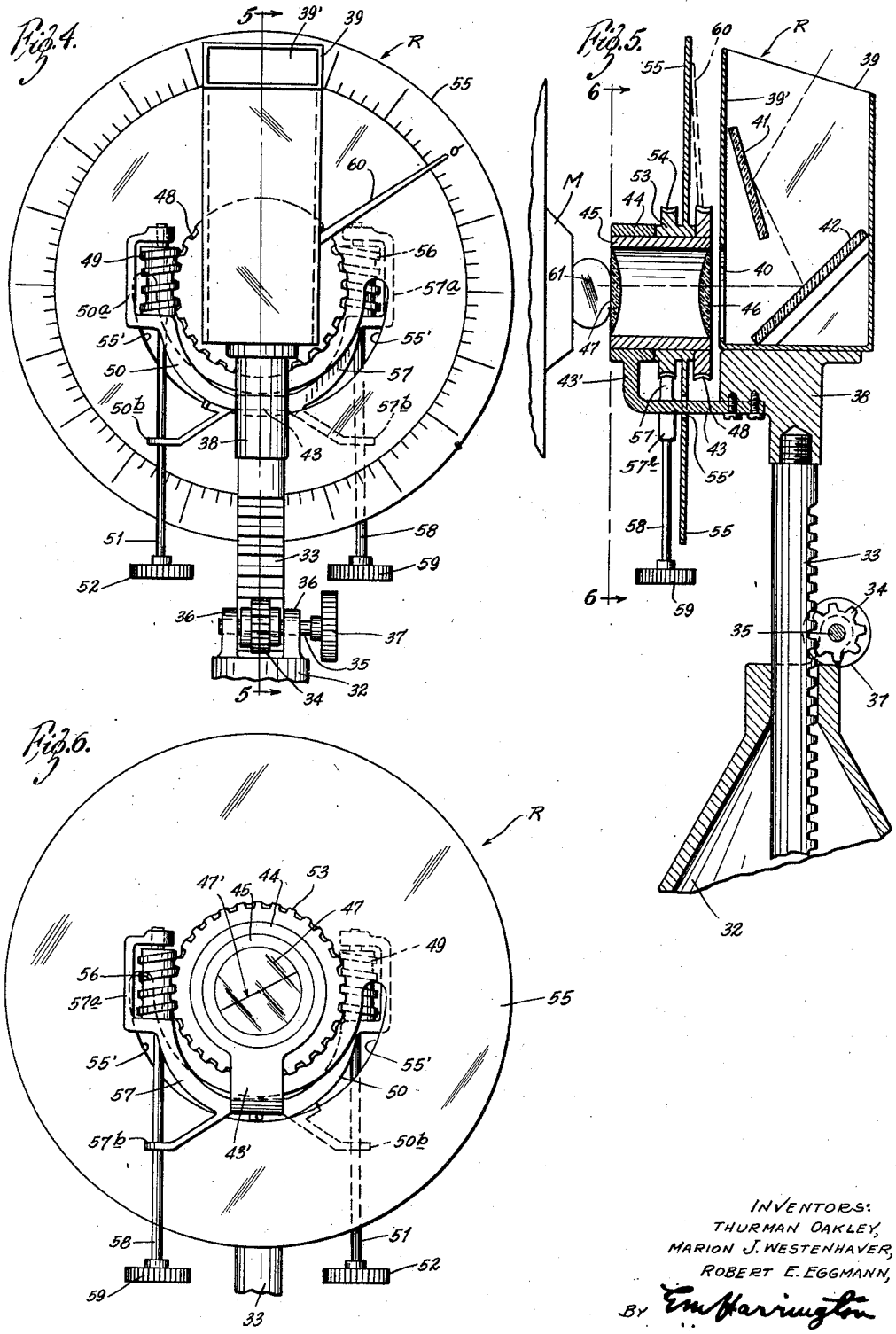
INVENTORS:
THURMAN OAKLEY,
MARION J. WESTENHAVER,
ROBERT E. EGGMANN,
By Em Harrington
ATTORNEY.

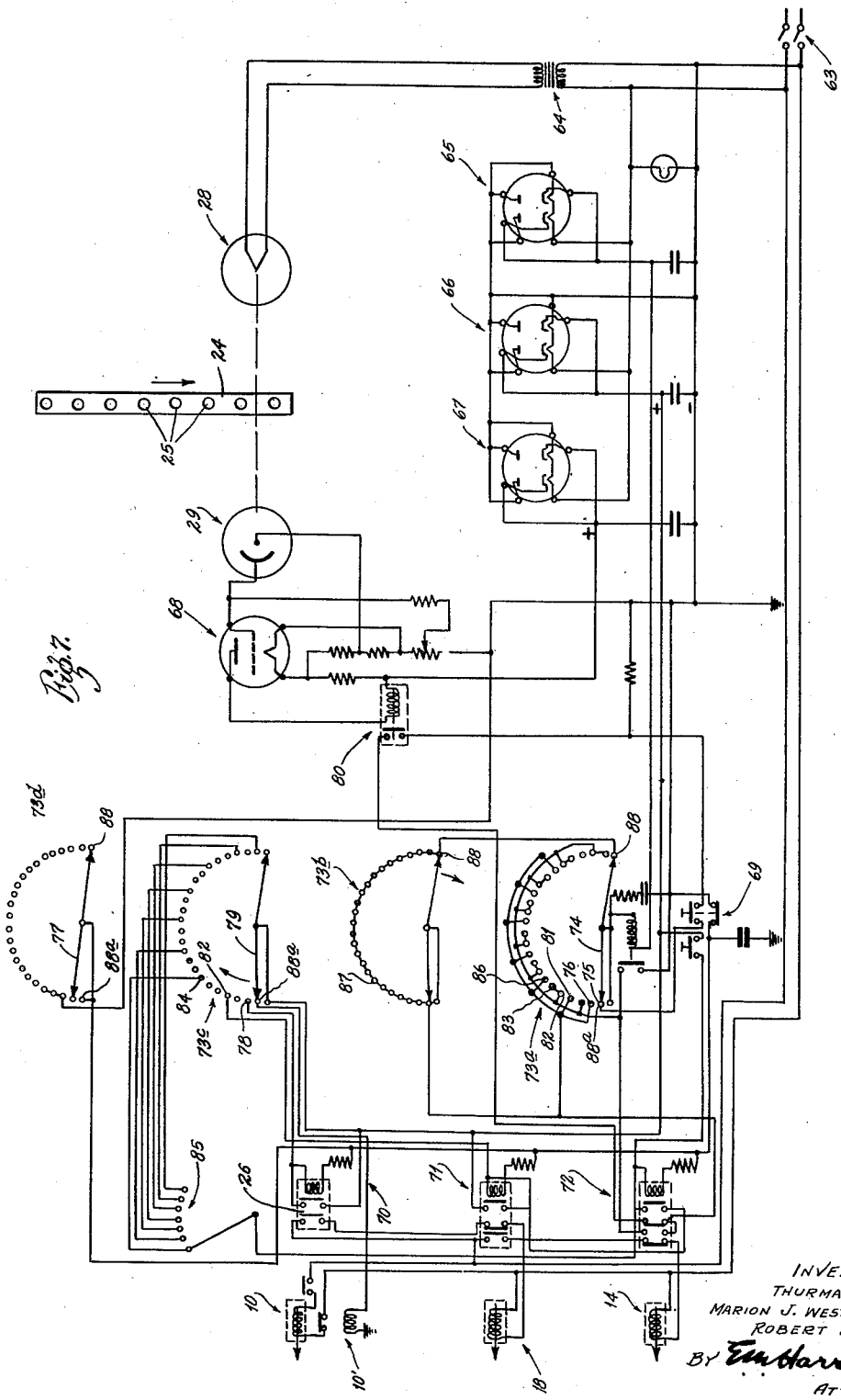

Patented Sept. 7, 1948

2,448,616

UNITED STATES PATENT OFFICE 2,448,616

GAS METER PROVER APPARATUS

Thurman Oakley, Bellesville, and Marion J. Westenhaver and Robert E. Eggmann, East St. Louis, Ill., assignors, by direct and mesne assignments, to Electronic Tester of Gas Meters, Inc., St. Louis, Mo., a corporation of Missouri Application June 19, 1944, Serial No. 541,094

7 Claims. (Cl. 73—3)

1

This invention relates to gas meter proving apparatus of the type adapted for use in testing the accuracy of movement and registration of the registering means of gas meters by passing through gas meters being tested accurately measured volumes of air, the predominant object of the invention being to provide an improved apparatus of this type which is so completely automatic in its operation that the opportunity for human error to effect the gas meter testing operations is reduced to a minimum.

Commercial gas meters of various types and sizes, having bellows displacement means for determination of the volume of gas passed through the meters, and provided with geared indexing means for registering said volume of gas passed through the meters, are at present tested for accuracy by passing through the meters accurately measured volumes of air from accurately calibrated air tanks or prover bells connected to the meters and controlled manually. In making this type of test, the operator observes the movement of the prover index hand with respect to the meter prover dial while passing an amount of air through the meter that will cause the prover index hand to make one revolution, which is equivalent to the registration of the passage through the meter of two cubic feet of air. The accuracy of such a test is dependent on the keenness of the eye of the operator making the test, and the coordination of eye and hand, inasmuch as the flow of air to the meter is shut off manually by the operator when the prover index hand of the meter has made a complete revolution, as nearly as can be judged by the eye, and the actual volume passed through the meter is determined by the shrinkage in volume of the air in the air tank or prover bell. If the test indicates that the volume of air passed through the meter is more or less than exactly two cubic feet, the meter is registered as either slow or fast and proper adjustments are made of its mechanism to bring it to accuracy, the tests being repeated until the meter registers accurately.

The testing operation briefly described above is subject to a number of possibilities of error, and the prime purpose of this invention is to provide an improved testing apparatus in the use and operation of which these possibilities of error are eliminated. Briefly stated, the starting and stopping of the gas meter prover of the present invention is controlled automatically through the reactions of an electronic circuit, that includes a light source and a photo-electric cell, which sets up the current necessary to operate electrical relays which open and close the valve means when exactly the predetermined volume of air to be used in the test has been passed from the bell of the prover, to and through the meter under test.

2

The apparatus of the present invention differs in its operation from the meter testing method heretofore followed, as briefly described above, in that an accurately calibrated prover bell is established as the standard of comparison and the flow of air from this prover bell to the meter under test is accurately controlled in an automatic manner so as to eliminate human error.

Fig. 1 is a front elevation of the improved gas meter prover apparatus of the present invention, showing same as it appears when a meter is being tested thereby.

Fig. 2 is an enlarged, fragmentary, horizontal section taken on line 2—2 of Fig. 1.

Fig. 3 is a fragmentary plan view of the means of the present invention which is arranged in association with a meter being tested by the improved gas meter prover apparatus and which aids the operator of the apparatus in reading the prover index dial of the meter during such test.

Fig. 4 is a fragmentary front elevation of the structure illustrated in Fig. 3.

Fig. 5 is a vertical section taken on line 5—5 of Fig. 4.

Fig. 6 is a rear elevation taken on line 6—6 of Fig. 5 and looking in the direction indicated by the arrows.

Fig. 7 is a diagrammatical view illustrating the electrical wiring arrangement of the improved gas meter prover apparatus disclosed herein.

In the drawings, wherein is shown for purposes of illustration, merely, one embodiment of the invention, A designates the gas meter prover apparatus generally. The gas meter prover apparatus is generally of standard construction and arrangement, comprising a lower tank portion 1, and a bell 2 which is supported for vertical movement with respect to said lower tank portion, there being a body of water (not shown) contained in the lower tank portion 1 whose surface provides the bottom wall of an air chamber within the bell. The bell 2 has suitably attached to its upper portion by means of attaching elements 3 a flexible member 4, said flexible member being passed over a rotatably-supported pulley 5 and having weights 6 attached to its free end which serve to counterbalance the weight of the bell 2.

Forming a part of the gas meter prover apparatus is a pipe assembly which includes a pipe 7 that communicates with the air chamber within the bell 2 and extends downwardly therefrom within the interior of the lower tank portion 1 of the prover, said pipe 7 extending through a lower wall portion of the prover tank and extending upwardly at the exterior of the tank portion of the prover to the member 8. Connected into the member 8 is a pipe 9 which leads from a source of air (not shown), said pipe 9 being provided with a motor valve 10 which, as will presently appear herein, controls the passage of air into the air chamber of the prover bell 2. The pipe 9 is provided also with a pressure regulator 11 which controls the pressure of the air which passes through said pipe 9 to the air chamber of the prover bell, and additionally said pipe 9 is provided with a connection 12 which is adapted to lead to a pressure gauge (not shown).

Connected into the member 8 is a pipe 13 in which is interposed a magnetic valve 14, said magnetic valve 14 being connected to a connection 15 into which is also connected a pipe and fitting assembly 16 which leads to the inlet of the meter M to be tested, said magnetic valve 14 serving to control the flow of air from the prover bell 2 to the meter M being tested with the aid of the gas meter prover apparatus. Connected into the pipe 13 is a pipe and fitting assembly 17, and connected into said pipe and fitting assembly 17 is a magnetic valve 18 which, as will presently appear herein, serves to control the leveling of the prover bell 2 by discharging air from said bell to atmosphere. Additionally, the general pipe assembly of the gas meter prover apparatus includes a pipe and fitting assembly 19 which provides a by-pass around the magnetic valves 14 and 18, one end of said by-pass being connected into a fitting 20 which is connected in the pipe 9, and the opposite end of said by-pass being connected into the fitting 15 into which the magnetic valve 14 and the pipe and fitting assembly 16 are connected. The pipe and fitting assembly 19 which provides the by-pass around the magnetic valves 14 and 18 has interposed therein a manually operable valve 21, which, on actuation thereof, permits air to flow from the prover bell 2 to the meter M being tested to allow for manual testing of the meter, if required, or to permit purging of the meter, so as to bring the prover index dial hand of the meter to its starting position. If desired, the fitting 15 may have connected thereto a suitable thermometer 22, in order that the temperature of the air passing to the meter M may be indicated.

The bell 2 of the gas meter prover apparatus A is provided with a vertically disposed scale 23 which is suitably fixed thereto for movement therewith, and this scale is provided with the usual graduations found on scales of prover bells. In other words the graduations on the scale 23 include a zero mark, and one, two, three, four and five feet marks, if the bell be a standard five feet prover bell, and additional feet marks if it be a larger bell. The scale 23 of the prover bell 2 has fixed thereto a strip of material 24 which extends longitudinally thereof and projects forwardly from said scale at an approximate right angle with respect thereto, as is shown to the best advantage in Fig. 2. The strip of material 24 is provided with spaced perforations 25 which are formed at the locations of the feet marks of the scale 23, said strip of material 24, except for these perforations, being solid. The bell 2 of the prover apparatus A is provided at its upper end with a limit switch 26 which is operated by a resilient element 27 fixed to the upper portion of the bell, said resilient element engaging the limit switch when the bell reaches its upper limit of movement, as air is being introduced into the prover bell, to actuate the motor valve 10 to its closed position and thereby close the pipe 9 against passage of air therethrough to the prover bell.

Supported by the lower tank portion 1 of the prover apparatus A, at the top thereof, is an assembly comprising a light source 28 and a photo-electric cell 29, said light source and photo-electric cell being spaced apart, with the strip of material 24 being interposed therebetween, as is shown in Fig. 1. The beam of light directed by the light source 28 toward the photo-electric cell 29 is interrupted by the strip of material 24 except when a perforation 25 of said strip of material moves into alinement with said beam of light, and when this occurs the light beam strikes the photo-electric cell and produces a current flow therein which sets in operation electrical elements forming parts of the improved gas meter prover apparatus, certain of these electrical elements being supported by the control chassis 30 and the control panel 31, shown diagrammatically in Fig. 1.

The meter-reading means R of the present invention, which aids the operator of the prover apparatus in obtaining accurate readings of the prover index dial of a meter being tested, comprises a suitable base 32 which is disposed at the front of the meter to be tested. The meter-reading means R includes an upper portion which is supported by the base 32, said upper portion including a vertically disposed rack 33 whose teeth are engaged by the teeth of a pinion 34 which is fixed on a shaft 35 mounted for rotation by ears 36 formed on the base 32, said shaft having fixed thereto, also, a hand wheel 37 which may be rotated to rotate the shaft 35 and thereby adjust the rack vertically through cooperation of the teeth of the pinion and the rack.

The upper portion of the meter-reading means R includes a member 38 to which the rack 33 is fixed (Fig. 5), and supported by said member 38 is a sighting housing 39 which is open at the top and is provided with an opening 40 formed in the wall 39' thereof. Also, mounted within the sighting housing 39 is a mirror 41 and a mirror 42 which are arranged as is shown to good advantage in Fig. 5. Secured to the member 38 is an arm 43 which extends rearwardly from said member and which is provided with an upstanding portion 43', said upstanding portion being provided at its upper end with an integral, annular portion 44 of substantial width. The annular portion 44 embraces and supports for rotation with respect thereto a tubular member 45 and this tubular member supports at its opposite ends magnifying lenses 46 and 47, said lenses being in precise alinement with the opening 40 of the sighting housing 39, and the lens 47 having a diametral hair line 47' etched across its face (Fig. 6), or otherwise associated with said lens 47.

Fixed to the tubular member 45 at an end thereof is a worm wheel 48 with which a worm 49 is arranged in mesh, said worm being disposed vertically and being supported for rotation by an extension 50 which constitutes a part of the arm 43. The extension 50 includes a yoke-shaped portion 50a at its upper end in which the worm 49 is disposed, said worm being supported by a rod 51 which is supported for rotation by the yoke portion 50a and extends through a portion 50b of said extension 50, and said rod at its lower end being provided with a hand wheel 52 which facilitates rotation of said rod and worm so as to rotate the tubular member 45 through cooperation of the worm 49 and the worm wheel 48.

The tubular member 45 has mounted thereon for rotary movement with respect thereto an annular element 53 on which is formed an outstanding worm wheel 54, and also formed on said annular element 53, or fixed thereto, is a circular plate 55 which is suitably graduated to provide a dial, said circular plate having an arcuate slot 55' formed therein through which the arm 43 extends. The worm wheel 54 has associated therewith a worm 56 which is supported by an extension 57 formed on the arm 43, said extension 57 being constructed and arranged in accordance with the extension 50 in that it is provided with a yoke-shaped upper portion 57a which receives the worm 56 and supports for rotation a rod 58 to which said worm is fixed, with said rod being extended through a portion 57b of said extension 57. Also the lower portion of the rod 58 has fixed thereto a hand wheel 59 which facilitates rotation of said rod 58 and said worm 56 so as to rotate the annular element 53 through cooperation of the worm 56 and the worm wheel 54. The worm wheel 48 has fixed thereto an indicating hand 60 which is associated with the dial provided by the circular plate 55 and is movable with respect thereto. The meter-reading means R includes, also, a pair of lamps 61 and 62 which are so supported and positioned that light is directed therefrom on the prover dial of a meter being tested, as is shown in Fig. 3.

When the meter-reading means R is to be arranged in association with a meter to be tested, said meter-reading means is arranged in position with respect to the meter and the pinion 34 is rotated to bring the lenses 46 and 47 into precise alinement with the prover dial of the meter. The indicating hand of the prover dial of the meter having been brought to the zero, or starting, position, the worm 49 is rotated to adjust the hair line 47' of the lens 47 to a position where it coincides precisely with the position of the indicating hand of the prover dial of the meter. In making this adjustment the operator is aided by the fact that the lamps 61 and 62 provide sufficient light for him to see clearly the prover dial of the meter, and, also, the lenses 46 and 47 magnify the prover dial of the meter, and a magnified image of the prover dial of the meter is projected by the mirror 42 onto the mirror 41 where it may be seen clearly by the operator when looking into the sighting housing 39.

The indicating hand 60, associated with the dial 55 at all times occupies a position corresponding to the position of the hair line 47' of the lens 47, because said hair line and indicator hand are movable together in fixed relationship, and therefore, when the hair line 47' has been alined precisely with the indicating hand of the prover dial of the meter, the indicator hand 60 will occupy a corresponding position. The operator then rotates the worm 56 to rotate the annular element 53 about the tubular member 45, and in this manner the dial 55 is rotated to bring its graduations, which correspond to the graduations of the prover dial of the meter, to positions where the indicating hand 60 occupies the same relationship to the graduations of the dial 55 as that between the indicating hand and the graduations of the prover dial of the meter. With the described adjustments being completed the meter-reading means R is ready for the commencement of the meter testing operation.

By referring to Fig. 7, which is a diagram of the wiring, relays, and switching devices associated with the control chassis 30 and the control panel 31, it will be noted that the illustrated circuits include an A. C. voltage supply to a switch 63, with a tap leading to a transformer 64 supplying reduced voltage for the light source 28, unreduced A. C. voltage supplying power for operating the magnetic valves 14 and 18, and the motor operated valve 10, as well as for operating rectifier tubes 65, 66, and 67, producing D. C. voltage for operation of the photo-electric tube 29, amplifier tube 68, and the various relays to be hereinafter referred to.

When the switch 63 is closed, A. C. current is applied to the rectifier tubes 65, 66, and 67, and to the light source 28, through the transformer 64. By depressing a start-reset switch 69 contact 69b thereof is momentarily opened and negative voltage is removed from the relays 70, 71, and 72, contact 69a of said contact 69 being immediately closed and a negative voltage is passed to the coil of the rotary switch 73a through contact 88a and the rotating arm 74 of said rotating switch 73a, causing said rotating arm to move from contact 75 to contact 76, thereby passing a negative voltage to relay 70 through the rotating arm 77 on rotary switch 73d, and at the same time passing positive voltage to relay 70 through contact 78 of rotary switch 73c and rotating arm 79 which picks up relay 70, applying A. C. voltage and opening magnetic valve 18 which permits the prover A to discharge sufficient air to atmosphere to bring prover bell 2 down to its zero position on scale 24. When the appropriate aperture 25 of the scale 24 associated with the prover bell 2 reaches the zero position, light is permitted to pass through said aperture from the light source 28 and fall on the photo-electric cell 29. This action produces a current flow in the photo-electric cell which changes the bias on the amplifier tube 68 to the point that a plate current flow is produced which is sufficient to pick up relay 80 and close contacts connected to the rotary switch coil through contact 76 on rotary switch 73a and rotary arm 74. Rotary arm 74 is caused to move to contact 81, thereby supplying positive voltage to relay 71 through rotating arm 79 and contact 82 of rotary switch 73c and causing magnetic valve 18 to close. This cuts off flow of air from prover bell 2 to atmosphere and further causes magnetic valve 14 to open to permit flow of air from the prover bell 2 through the piping to the meter A being tested.

The negative voltage is connected to contact 86 of rotating switch 73a and rotary switch 73b only when the photo-electric cell 29 is functioning, it being noted that all of the contacts of rotary switch 73b are tied in with the outer arcuate conductor of rotary switch 73a. It will also be noted that the voltage may be switched from a constant voltage to an interrupted voltage at the end of each test by the relay 72. The semi-circular movement of the switches 73a, 73b, 73c, and 73d is accomplished by applying negative voltage to the operating coil of the rotary switch 73a through the contact arms of said rotary switch 73a and the contact arms of the rotary switch 73b, said negative voltage being applied only when the relay 80 is picked up from the photo-electric cell 29. After the test is completed the relay 72 is picked up and switches the voltage from the relay 80 to the interrupted voltage and when this voltage is applied to the operating coil of the rotary switch 73a it momentarily opens the contacts in engagement and causes contact arms 74, 77, and 79, and the contact arm of the rotary switch 73b to each move one step, this operation being continued until said contact arms comes to rest on the contacts 88a.

The bell 2 of the prover A continues to fall until the aperture 25 in the scale 24, at the one cubic foot mark, reaches a position where light may pass therethrough from the light source 28 to the photo-electric cell 29, thereby producing a current flow in the photo-electric cell 29 which changes the bias on amplifying tube 68 to a point that the plate current flow is sufficient to pick up relay 80. This closes contacts connected to the rotary switch coil through contact 81 and rotary arm 74 of rotary switch 73a, causing said rotary arm 74 to move through contacts 82 and 83 of said rotary switch 73a, and supply a positive voltage through rotary arm 79 and contact 84 of rotary switch 73c to selector switch 85 and to relay 72, to close magnetic valve 14, and connect a negative voltage to contact 86 of rotary switch 73a, and to the contacts including and extending from contact 87 to contact 88 of rotary switch 73b. The rotating arms of the rotary switches 73a, 73b, 73c, and 73d, which are mounted on a common shaft and move together, complete a semi-circular movement, with said rotating arms stopping on the appropriate contacts of said rotary switches to supply positive D. C. voltage, through rotating arm 79 of the rotating switch 73c and contact 88a of said rotating switch 73c to the relay 10', which opens the valve 10, thus permitting air to flow into the prover bell 2 to fill said prover bell and causing it to assume its original position (a point above zero position). When the prover bell is filled the limit switch 26 opens, due to pressure thereagainst of the resilient element 27 fixed to the bell, and the valve 10 is closed, thus completing a testing cycle.

The operation described above is based on the use of selector switch setting that provides for the prover bell stopping as the light beam from the light source 28 impinges on the photo-electric cell 29 through an aperture 25 in the scale 24 when said aperture reaches a predetermined position. It is obvious, however, that this stopping point of the prover bell is not fixed, as the selector switch may be set so that the prover bell will be stopped at any of various positions, according to aperture locations on the scale 24, such settings of the selector switch causing operation of the relay 80 to supply negative voltage to the appropriate contacts of the rotary switch 73a through the rotating arm 74, and causing the rotating arm 79 of the rotary switch 73c to pass positive voltage through the appropriate contacts of said rotary switch 73c so as to pick up the relay 72 and close the magnetic valve 14 at the previously determined point.

When the testing of a meter has been completed, as described above, the operator inspects the prover dial of the meter by looking into the sighting housing 39, and if the indicating hand of said prover dial stopped on the exact spot from which it started he will know that the meter is registering accurately, as exactly two cubic feet of air from the prover bell will have been passed through the meter during exactly one revolution of the indicating hand of the prover dial of the meter. If, however, the indicating hand of the prover dial of the meter stops short of its starting point, or goes beyond said starting point, the operator will know that the meter is registering slow or fast, as the case may be. The operator will then again adjust the hair line on the lens 41 to cause it to coincide with the position of the indicating hand of the prover dial of the meter, thereby correspondingly moving the hand 60 with respect to the dial 55, and he may thereby obtain from said dial 55 an accurate reading as to the degree of inaccuracy in direct percentages of the meter registering mechanism and may adjust said mechanism accordingly.

We claim:

1. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, a photo-electric assembly comprising a light source and a photo-electric cell supported in spaced relation with said light source, means electrically associating said valve with said cell so as to control actuation of said valve, and a member movable with said bell in interposed relation with respect to said light source and said photo-electric cell for controlling passage of light from said light source to said photo-electric cell so as to control actuation of said valve in response to operation of said photo-electric cell.

2. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, exhaust means including an electrically-actuated valve for exhausting testing medium from the chamber of said bell to atmosphere exterior of said bell for leveling the bell, a photo-electric assembly comprising a light source and a photo-electric cell supported in spaced relation with said light source, means electrically associating the first-mentioned and the second-mentioned electrically-actuated valves with said cell so as to control actuation of said first-mentioned and said second-mentioned electrically actuated valves, and a member movable with said bell in interposed relation with respect to said light source and said photo-electric cell for controlling passage of light from said light source to said photo-electric cell so as to control actuation of said first-mentioned and said second-mentioned electrically-actuated valves in response to operation of said photo-electric cell.

3. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, inlet means including an electrically-actuated valve for introducing testing medium into the chamber of said bell, a photo-electric assembly comprising a light source and a photo-electric cell supported in spaced relation with said light source, means electrically associating the first-mentioned and the second-mentioned electrically-actuated valves with said cell so as to control actuation of said first-mentioned and said second-mentioned electrically actuated valves, and a member movable with said bell in interposed relation with respect to said light source and said photo-electric cell for controlling passage of light from said light source to said photo-electric cell so as to control actuation of said first-mentioned and said second-mentioned electrically-actuated valves in response to operation of said photo-electric cell.

4. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, exhaust means including an electrically-actuated valve for exhausting testing medium from the chamber of said bell to atmosphere exterior of said bell for leveling the bell, inlet means including an electrically-actuated valve for introducing testing medium into the chamber of said bell, a photo-electric assembly comprising a light source and a photo-electric cell supported in spaced relation with said light source, means electrically associating the first-mentioned, the second-mentioned, and the third-mentioned electrically-actuated valves with said cell so as to control actuation of said first-mentioned, said second-mentioned, and said third-mentioned electrically actuated valves, and a member movable with said bell in interposed relation with respect to said light source and said photo-electric cell for controlling passage of light from said light source to said photo-electric cell so as to control actuation of said first-mentioned, said second-mentioned, and said third-mentioned electrically-actuated valves in response to operation of said photo-electric cell.

5. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, inlet means including an electrically-actuated valve for introducing testing medium into the chamber of said bell, a photo-electric assembly comprising a light source and a photo-electric cell supported in spaced relation with said light source, means electrically associating the first-mentioned and the second-mentioned electrically-actuated valves with said cell so as to control actuation of said first-mentioned and said second-mentioned electrically actuated valves, a member movable with said bell in interposed relation with respect to said light source and said photo-electric cell for controlling passage of light from said light source to said photo-electric cell so as to control actuation of said first-mentioned and said second-mentioned electrically-actuated valves in response to operation of said photo-electric cell, and a limit switch adapted for automatic operation to close the electrically-actuated valve of said inlet means when said bell reaches a limit of its movement.

6. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, exhaust means including an electrically-actuated valve for exhausting testing medium from the chamber of said bell to atmosphere exterior of said bell for leveling the bell, inlet means including an electrically-actuated valve for introducing testing medium into the chamber of said bell, a photo-electric assembly comprising a light source and a photo-electric cell supported in spaced relation with said light source, means electrically associating the first-mentioned, the second-mentioned, and the third-mentioned electrically-actuated valves with said cell so as to control actuation of said first-mentioned, said second-mentioned, and said third-mentioned electrically actuated valves, a member movable with said bell in interposed relation with respect to said light source and said photo-electric cell for controlling passage of light from said light source to said photo-electric cell so as to control actuation of said first-mentioned, said second-mentioned, and said third-mentioned electrically-actuated valves in response to operation of said photo-electric cell, and a limit switch adapted for automatic operation to close the electrically-actuated valve of said inlet means when said bell reaches a limit of its movement.

7. A meter testing apparatus comprising a prover including a movable bell providing a chamber for a meter-testing medium, piping leading from the chamber of said bell and adapted to be connected to a meter to be tested, an electrically-actuated valve interposed in said piping and operable to control passage of testing medium from the chamber of said bell to the meter being tested, exhaust means including an electrically-actuated valve for exhausting testing medium from the chamber of said bell to atmosphere exterior of said bell for leveling the bell, inlet means including an electrically-actuated valve for introducing testing medium into the chamber of said bell, a photo-electric assembly comprising a light source and a photo-electric cell supported in spaced relation with respect to said light source, a member movable with said bell in interposed relation with respect to said light source and said photo-electric cell for controlling passage of light from said light source to said photo-electric cell, said member being adapted to normally interrupt light directed by said light source toward said photo-electric cell and being provided with a plurality of apertures for permitting passage of light therethrough when the various apertures reach predetermined positions during movement of said member with said bell, and electrically operated means for controlling actuation of said first-mentioned, said second-mentioned, and said third-mentioned electrically-actuated valves in response to passage of light from said light source to said photo-electric cell.

THURMAN OAKLEY.
MARION J. WESTENHAVER.
ROBERT E. EGGMANN.

REFERENCES CITED

The following references are of record in the file of this patent:

UNITED STATES PATENTS

| Number | Name | Date |
| --- | --- | --- |
| 1,254,361 | Ryland | Jan. 22, 1918 |
| 1,934,291 | Baas | Nov. 7, 1933 |
| 1,991,310 | Baas | Feb. 12, 1935 |
| 2,028,049 | Dennis | Jan. 14, 1936 |
| 2,039,506 | Wagner et al. | May 5, 1936 |
| 2,197,204 | Cooper | Apr. 16, 1940 |
| 2,361,175 | Carpenter | Oct. 24, 1944 |